United States Patent Office 3,145,153
Patented Aug. 18, 1964

3,145,153
RECOVERY OF STREPTOKINASE FROM
FERMENTATION MASHES
George Krupka, Nanuet, N.Y., Jerome Samson Schultz, Monsey, N.J., and Donald Theodore Winski, Brooklyn, N.Y., assignors to American Cyanamid Company, Stamford, Conn., a corporation of Maine
No Drawing. Filed Jan. 15, 1963, Ser. No. 251,478
4 Claims. (Cl. 195—66)

This invention relates to the recovery of streptokinase from fermentation harvest mashes and more particularly is concerned with an improved process for recovering a crude streptokinase preparation from such fermentation beers involving the use of activated magnesium silicate to adsorb the streptokinase thereon and subsequent desorption with alkaline aqueous solvent mixtures.

Streptokinase is well known as an enzyme elaborated by certain strains of beta-hemolytic streptococci, especially those of Group A and Lancefield Group C streptococci. The production of streptokinase by fermentation of these organisms is accompanied by the formation of various other metabolic by-products including substantial amounts of streptodornase and lesser amounts of numerous other substances and impurities some of which have been identified as hyaluronidase, streptolysin, diphosphopyridine nucleotidase, etc. Several means of processing fermentation beers to effect the recovery therefrom of streptokinase, associated to some extent with these extraneous substances, have been described in the patented art.

One of the best procedures for recovering streptokinase from the fermentation mash is described in the Ablondi and Mills Patent No. 2,784,145 which involves the use of magnesium silicate as an absorbent and an alkaline elution step.

It would be highly desirable for large-scale commercial production, however, to provide means for increasing the initial recovery of good quality streptokinase from fermentation harvest mashes.

We have now discovered that it is possible to substantially increase the recovery of streptokinase from fermentation beers with relatively low amounts of streptodornase and various other lytic principals normally found in such beers.

Surprisingly, in accordance with the present invention we have discovered that this can be accomplished by modifying the alkaline eluting solution of the Ablondi and Mills patent by the addition of a specified miscible organic liquid, specifically ethanolamine, dimethylformamide or a methyl lower alkyl ketone solvent such as methyl ethyl ketone or acetone. The alkaline elution with the solvents of the present invention results in an increase in yield of streptokinase of about 15 to 20% as compared with the prior art aqueous alkaline elution technique.

In a more preferred embodiment of the present invention it has been discovered that still further increases in yield of purified streptokinase can be achieved if the magnesium silicate adsorbent used in the Ablondi and Mills patent is pre-conditioned by contact with spent fermentation harvest mash preferably on a 1 percent by volume basis. In carrying out this aspect of the present invention the mixture is stirred for a period of time, usually about 2 hours, and allowed to settle for a period of time; usually about ½ hour. The supernatant liquid and contained debris is then decanted or siphoned off and the pre-conditioned magnesium silicate which remains is slurry-packed into a column and washed with a diluted ammonium hydroxide solution until the discharge liquid reaches a pH value above 11.0. The column is then back-washed with water to a pH of below 9.0. The column is next washed with a 10 percent hydrochloric acid solution until the pH of the discharge liquid is below 7.0. A water back-wash to about pH 7.0 completes the pre-conditioning-regeneration-activation sequence.

The adsorbent used herein is activated magnesium silicate sold under the trademark Florisil and produced as described in United States Patent No. 2,393,625. The magnesium silicate used in this invention is 60 to 100 mesh, consists of hard, porous granules, is stable in water or organic solvents, is capable of regeneration after use and has the following average composition: $MgO=15.5\pm0.5\%$, $SiO_2=84.0\pm0.5\%$, and $Na_2SO_4=0.5\%$ (1.0% max.).

In accordance with the present invention, a streptokinase mash, previously treated by the addition of 0.001 percent hexylresorcinol to kill the bacterial growth therein, is cooled to 12–16° C. and the pH is adjusted to between 5.0 and 8.0, preferably between 6.0 and 6.5. The magnesium silicate as described above is added to the mash in an amount ranging from about 0.01 to 0.10 part by weight for each part by weight of mash. The materials are maintained in contact for a suitable period of time, usually about two hours and then allowed to stand. The adsorbent with the streptokinase adsorbed thereon is separated from the mash by settling and decantation.

The spent mash, that is cells, debris, and mother liquor, are thereafter decanted or siphoned off and the residual solids are suspended in water. The magnesium silicate cake is preferably washed four times by resuspending it in water, allowing the mixture to settle and decanting the supernatant which contains cells and debris. The washed cake is then preferably packed into a column and back-washed with water until clear. The streptokinase is eluted by passing through the bed an alkaline solution preferably sodium carbonate in a pH in the range of 9.5 to 11.5 and containing from 1 to 50% and preferably 15% of one of the specified organic solvents. Acetone is the solvent of choice. Alternatively, the mixture is stirred and filtered whereupon the streptokinase passes into the filtrate. The streptokinase can be recovered from the eluate by conventional means, such as precipitation with subsequent elution from ion exchange resins, etc.

The other conditions of the process, that is, the use of acid to make the initial pH adjustment of the beer and the alkali used in the dilute alkaline step are preferably as described in the Ablondi and Mills patent.

It should be ntoed that the operating conditions described above for the adsorption and desorption of streptokinase from the fermentation mash are also effective in recovering streptodornase and hyaluronidase from the mash as well.

Streptokinase assays in the present invention were carried out according to the method of Christensen, J. Clin. Invest. 28, 163 (1949). A unit of streptokinase is the amount of streptokinase which will activate enough plasminogen to give enough plasmin to liquefy a standard clot formed from bovine fibrinogen and thrombin in 10 minutes at 37° C.

The invention will be described in greater detail in conjunction with the following specific examples.

EXAMPLE 1

To 20 liters of streptokinase mash previously treated by the addition of 0.001 percent hexylresorcinol to kill the bacterial growth therein, was added 200 grams of 60–100 mesh acid washed Florisil magnesium silicate. The mixture was stirred for 2 hours. The magnesium silicate was allowed to settle for 15 minutes and the spent mash decanted. The remainder of the cells were removed by two more washings in separate 2-liter volumes of distilled water; the water being subsequently decanted in each instance. The magnesium silicate was collected by filtration, rinsed with distilled water, then washed with 2 liters of a 1% solution of sodium bicarbonate. The solution was allowed to percolate through the magnesium silicate. A slight vacuum was applied terminally. The magnesium silicate was collected and weighed 342 grams wet. Fourteen 15-gram portions were placed in individual 100-ml. beakers and 10 ml. of the indicated water or water-organic solvent mixture were added. These were allowed to stand for 1 hour with occasional stirring. The eluates were decanted and an additional 5 ml. of the appropriate elution mixture added to each beaker. The magnesium silicate was stirred and allowed to settle. The supernatant liquid was decanted into the 10 ml. primary eluates, making a total of 15 ml. of eluate from each beaker, i.e. 15 ml. of eluate per 15 grams of magnesium silicate or 1 ml. per gram. The eluates were assayed and, on this basis, percentage yields were calculated. Test results are shown in Table 1 below:

*Table 1*

| Volume | Liquid | Strepto-kinase, Units/ml. | Streptokinase Recovery | | Dielectric Constant of Solvent |
|---|---|---|---|---|---|
| | | | Total Units | Percent | |
| 20 l | Harvest Mash | 1,500 | | | |
| 20 l | Spent Mash | 10 | | | |
| 15 ml | 1% Bicarbonate Wash | 706 | 105,000 | 8.0 | |
| 15 ml | 10% Acetone | 14,412 | 216,180 | 16.6 | 21.4 |
| 15 ml | 1% N,N-Dimethylformamide | 26,765 | 401,475 | 30.8 | |
| 15 ml | 2½% Treithylamine | 39,655 | 594,825 | 45.8 | 3.1 |
| 15 ml | 2½% Triethanolamine | 24,138 | 362,070 | 27.9 | |

EXAMPLE 2

One 300-liter aliquot of killed fermentation harvest mash was adjusted to pH 6.0 with hydrochloric acid, and 3 kilograms of raw (not pre-conditioned) magnesium silicate was added. The mixture was stirred for 2 hours and then allowed to stand for 30 minutes. The cells and mother liquor were decanted, and the residual solids were re-suspended in 20 liters of water. The suspension was allowed to settle, and the liquor was decanted. The magnesium silicate cake was suspended in 30 liters of cold (0°–4° C.) water and, while the mixture was stirred, dilute aqueous alkali (dilute aqueous sodium carbonate) was added until the pH held at 10.8. After filtration, an assay was run on aliquot from the filtrate.

Another 300-liter aliquot of the same killed fermentation harvest mash was adjusted to pH 6.0 with hydrochloric acid and 3 kilograms of pre-conditioned magnesium silicate was added. The mixture was stirred for 2 hours and then allowed to stand for 30 minutes. The cells and mother liquor were decanted and the residual solids were resuspended in 20 liters of water. The suspension was allowed to settle and liquor was decanted. The magnesium silicate cake was suspended in 30 liters of a cold (0° to 4° C.), 0.086 M sodium carbonate solution containing 15% acetone and at a pH of 10.8. The mixture was stirred and filtered and an assay run on an aliquot of the filtrate. The results are shown in Table 2 below.

*Table 2*

| | Raw Magnesium Silicate | | | | Pre-Conditioned Magnesium Silicate | | | |
|---|---|---|---|---|---|---|---|---|
| | Volume (Liters) | Streptokinase | | | Volume (Liters) | Streptokinase | | |
| | | Units/ml. | Total Units | Recovery, Percent | | Units/ml. | Total Units | Recovery, Percent |
| Fermentation Harvest Mash | 300 | 1,300 | 390×10⁶ | | 300 | 1,300 | 390×10⁶ | |
| Eluate (Filtrate) | 25 | 11,700 | 292×10⁶ | 75 | 27 | 14,100 | 381×10⁶ | 98 |

EXAMPLE 3

Two 200-liter aliquots of a fermentation harvest mash were adjusted to pH 6.2 with 5 N hydrochloric acid. A 2-kilogram quantity of "raw" magnesium silicate (regenerated and acid activated) was added to one 200-liter aliquot. A 2-kilogram quantity of "pre-conditioned" (spent mash pre-conditioning followed by regeneration and acid activation) was added to the other 200-liter aliquot. Both raw and pre-conditioned 60–100 mesh magnesium silicate originally came from the same commercial batch. Both mixtures were processed from the harvest mash through the acetone-carbonate elution step according to Example 2. The following over-all streptokinase yields were obtained: Raw magnesium silicate= 25.9%; pre-conditioned magnesium silicate=85.8%.

EXAMPLE 4

A 20-liter portion of killed fermentation harvest mash was adjusted to pH 6.0 with 5 N NaOH solution. Two hundred grams of acid-washed magnesium silicate (60–100 mesh) were added and the slurry stirred mechanically for 2 hours. The magnesium silicate was allowed to settle and the spent broth was decanted. The magnesium silicate was next stirred sequentially into two fresh changes of distilled water. Each time the magnesium silicate was allowed to settle and the supernatant liquid was decanted and discarded. The magnesium silicate was washed into a sintered-glass funnel then washed, by percolation, with two liters of distilled water. At this point, the magnesium silicate was stirred into 1 liter of 1% sodium bicarbonate solution for 15 minutes and the slurry poured into the original sintered glass funnel. The magnesium silicate was rinsed with 500 ml. of 1% sodium bicarbonate by percolation. The rinse solution was discarded. The washed magnesium silicate was eluted by stirring it into one liter of iced distilled water and the pH adjusted to pH 11.3 with 5 N NaOH solution. After stirring for one-half hour, the eluate was filtered off through the original sintered glass funnel. The filtrate was adjusted to pH 7.0 with hydrochloric acid and saved for assay and subsequent treatment. The magnesium silicate was rinsed with about 100 ml. of cold distilled water and saved for re-use. Test results are shown in Table 3 below.

A second 20-liter portion of killed fermentation harvest mash was adjusted to pH 6.0 with 5 N NaOH solution. Two hundred grams of pre-conditioned magnesium silicate (60–100 mesh) were added and the slurry stirred mechanically for two hours. The magnesium silicate was allowed to settle and the spent broth was decanted. The magnesium silicate was next stirred sequentially into two fresh changes of distilled water. Each time the magnesium silicate was allowed to settle and the supernatant liquid was decanted and discarded. The magnesium silicate was washed into a sintered glass funnel then washed by percolation, with two liters of distilled water.

At this point, the magnesium silicate was stirred into 2 liters of a cold (0° to 4° C.), 0.086 M sodium carbonate solution containing 15% acetone and at a pH of 10.8. After stirring for one-half hour, the eluate was filtered off through the original sintered glass funnel. The filtrate was adjusted to pH 7.0 with hydrochloric acid and saved for assay and subsequent treatment. The magnesium silicate was rinsed with about 100 ml. of cold distilled water and saved for re-use. Test results are shown in Table 3 below.

*Table 3*

|  | Conventional Process ||||  New Process ||||
|---|---|---|---|---|---|---|---|---|
|  | Volume (Liters) | Streptokinase ||| Volume (Liters) | Streptokinase |||
|  |  | Units/ml. | Total Units | Recovery, Percent |  | Units/ml. | Total Units | Recovery, Percent |
| Fermentation Harvest Mash | 20.0 | 1,260 | $25.2 \times 10^6$ | | 20.0 | 1,260 | $25.2 \times 10^6$ | |
| Eluate (Filtrate) | 1.1 | 13,975 | $15.4 \times 10^6$ | 61 | 1.4 | 16,029 | $22.4 \times 10^6$ | 89 |

EXAMPLE 5

A 4000-liter batch of killed fermentation harvest mash was adjusted to pH 6.2 with hydrochloric acid and 40 kilograms of pre-conditioned magnesium silicate was added. The mixture was stirred for two hours and then allowed to stand for thirty minutes. The cells and mother liquor were siphoned off and the magnesium silicate resuspended in 300 liters of water. The suspension was allowed to settle and the liquor was decanted. The magnesium silicate cake was slurry-packed to produce a bed of 22 inches in height in an 18-inch diameter column. The column was approximately 4 to 5 feet in height. The contents of the column were flushed with 150 liters of distilled water. A 0.086 M sodium carbonate solution containing 15% by volume of acetone was used as the eluting fluid. The elution rate was 5 liters per minute, the pH of the eluting solution was 10.5 and the final volume of eluate was 580 liters. The eluate pH was adjusted to 7.1 with 5 N hydrochloric acid and 1 gram of sodium ethylmercurithiosalicylate was added as a preservative. An aliquot of the final eluate was assayed for streptokinase content. Test results are shown in Table 4 below.

*Table 4*

|  | Volume (Liters) | Streptokinase |||
|---|---|---|---|---|
|  |  | Units/ml. | Total Units | Recovery, Percent |
| Fermentation Harvest Mash | 4,000 | 2,400 | $960 \times 10^7$ | |
| Eluate | 580 | 15,300 | $887 \times 10^7$ | 92 |

EXAMPLE 6

A 300-liter quantity of hexylresorcinol-treated harvest mash was cooled to 12° C. and adjusted to pH 6.0. A 3-kilogram amount of magnesium silicate was added, the mixture stirred for 2 hours, and then the magnesium silicate was removed. The magnesium silicate was washed with 20 liters of 0.5% sodium bicarbonate solution and then divided into equal aliquots. Each aliquot was placed in a beaker. A single aliquot was mixed for 15 minutes with one of a variety of elution solutions, as shown in Table 5 below. The magnesium silicate was then removed from the solution and the solution was analyzed for streptokinase activity. The efficiency of some of the elution solutions is given in Table 5 below.

*Table 5*

| Eluting Solution | pH | Streptokinase Recovered, Percent |
|---|---|---|
| 15% Acetone | 7.1 | 24 |
| 15% Acetone + 0.5% NaCl | 7.0 | 50 |
| 15% Acetone + 0.063 M $Na_3PO_4$ | 11.1 | 82 |
| 15% Acetone + 0.086 M $Na_2CO_3$ | 11.2 | 97 |

EXAMPLE 7

Twenty liters of streptokinase broth were divided into two equal parts. To one part, new (never used) acid-washed magnesium silicate was added at the rate of ten grams per liter of broth. To the other portion, reused acid-washed magnesium silicate was added at the rate of ten grams per liter. Both batches were stirred for one hour and the magnesium silicate was allowed to settle for one-half hour. Th liquid containing the cells was decanted, and the magnesium silicate was freed of cells and broth by repeated stirring into fresh charges of tap-water, followed by the settling of the magnesium silicate and decantation of the washes. Each batch of magnesium silicate was rinsed with one liter of one percent sodium bicarbonate. The magnesium silicate was collected on a sintered glass funnel and the excess liquid removed by suction.

Ten-gram portions of damp magnesium silicate were placed in a small beaker and thirty-five mls. of the indicated mixture was added. The mixture was stirred with a magnetic stirrer for one-half hour and the magnesium silicate was collected on a sintered glass funnel. The magnesium silicate was rinsed with a small amount of eluting mixture. The eluate and wash were adjusted to pH 7–8 with dilute acid, and in each case the volume brought to fifty mls. This eluate was assayed for SK. The results obtained are shown in Table 6 below.

*Table 6*

N—New Florisil
Re—Reused Florisil

|  | No. 1 || No. 2 || Average || SK/mg. Protein N | SK/mg. Protein Re |
|---|---|---|---|---|---|---|---|---|
|  | N | Re | N | Re | N | Re |  |  |
| $Na_2CO_3$ 0.086 M | 29.5 | 57.2 | 47.3 | 74.4 | 38.4 | 65.8 | 5,143 | 4,826 |
| NaOH pH 11.2 | 54.1 | 83.4 | 71.7 | 66.2 | 62.9 | 74.8 | 5,554 | 4,066 |
| $Na_2CO_3$+15% Acetone | 70.5 | 88.7 | 74.5 | 84.1 | 72.5 | 86.4 | 8,685 | 16,843 |
| $Na_2CO_3$+15% Me-Et-Ketone | 53.2 | 64.8 | 74.4 | 85.8 | 63.8 | 75.3 | 5,577 | 7,938 |
| $Na_2CO_3$+15% D.M.F | 85.3 | 85.5 | 73 | 94.7 | 79.1 | 90.1 | 6,241 | 5,800 |
| Ethanolamine .086 M | 99 | 90.8 | 78.6 | 94.8 | 88.8 | 92.8 | 7,400 | 7,394 |
| Ethanolamine .086 M+15% Acetone | 77.1 | 97 | 79 | 88.2 | 78 | 92.6 | 8,723 | 8,502 |

We claim:

1. In a method of recovering streptokinase from fermentation mashes containing the same in which the pH of the mash is adjusted to between about 6 and 7.5, in which a quantity of a washed, activated, magnesium silicate is added thereto so as to preferentially adsorb the streptokinase thereon and in which the streptokinase is recovered therefrom by eluting with an alkaline aqueous solvent at a pH of between about 9.5–11.5, the improvement which comprises adding to the alkaline aqueous solvent from about 1 to 50% of a miscible organic liquid selected from the group consisting of ethanolamine, dimethylformamide and methyl lower alkyl ketone.

2. A method according to claim 1 in which the miscible organic liquid is acetone.

3. A method according to claim 1 in which the recovery of streptokinase is increased by contacting said magnesium silicate with spent fermentation mash prior to acid-activation.

4. A method according to claim 3 in which the miscible organic liquid is acetone.

No references cited.